United States Patent [19]

Jackson

[11] 4,447,324

[45] May 8, 1984

[54] WATER SCREEN WITH REVOLVING SCREEN MEMBER

[76] Inventor: Philip Jackson, 15 Rue Las Cases, 75007 Paris, France

[21] Appl. No.: 366,700

[22] Filed: Apr. 8, 1982

[30] Foreign Application Priority Data

Apr. 9, 1981 [FR] France .................. 81 07137

[51] Int. Cl.³ ............................................ B01D 33/02
[52] U.S. Cl. ................................ 210/159; 210/161; 210/393
[58] Field of Search ............ 210/155, 157, 158, 159, 210/160, 161, 393, 400, 411, 412

[56] References Cited

U.S. PATENT DOCUMENTS

| | | | |
|---|---|---|---|
| 963,186 | 7/1910 | Trump | 210/393 |
| 1,593,169 | 7/1926 | Geiger | 210/158 |
| 1,789,425 | 1/1931 | Cabrera | 204/276 |
| 2,804,209 | 8/1957 | Carlton et al. | 210/158 |
| 2,899,062 | 8/1959 | Heacock | 210/158 |
| 3,850,804 | 11/1974 | Taylor et al. | 210/155 |
| 4,186,091 | 1/1980 | Sutton | 210/160 |

FOREIGN PATENT DOCUMENTS 2045634 11/1980 United Kingdom .

*Primary Examiner*—Charles N. Hart
*Assistant Examiner*—Wanda L. Millard
*Attorney, Agent, or Firm*—Charles E. Brown

[57] ABSTRACT

A water screen comprises a revolving screen member, e.g., a band screen or a drum screen, and a washing device. The washing device, comprises a sprayer on one side of the downstream run of the screen member and a recovery channel on the opposite side of the downstream run of the screen member. On the same side as the recovery channel and between it and the sprayer is a mobile trough member. The trough transversely and obliquely from its leading edge adjacent the recovery channel, e.g. a band screen or a drum screen. The leading edge of the trough is maintained continuously in contact with the screen member which may be exclusively by the effect of gravitational force on the trough member.

7 Claims, 3 Drawing Figures

FIG. 2
FIG. 3
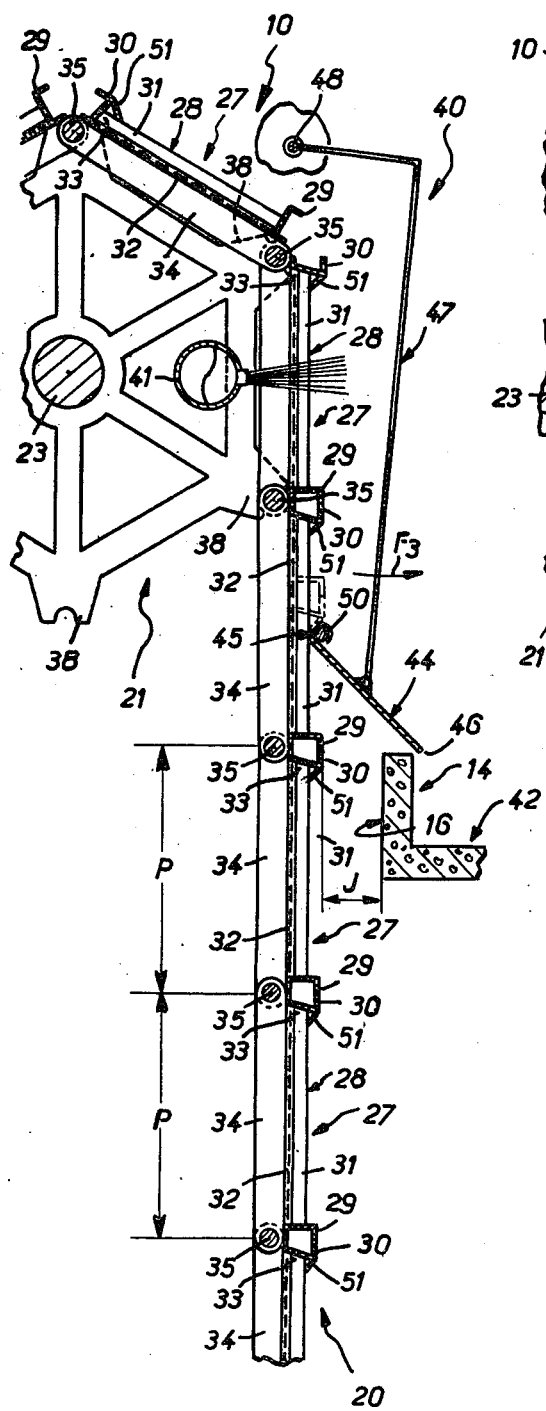
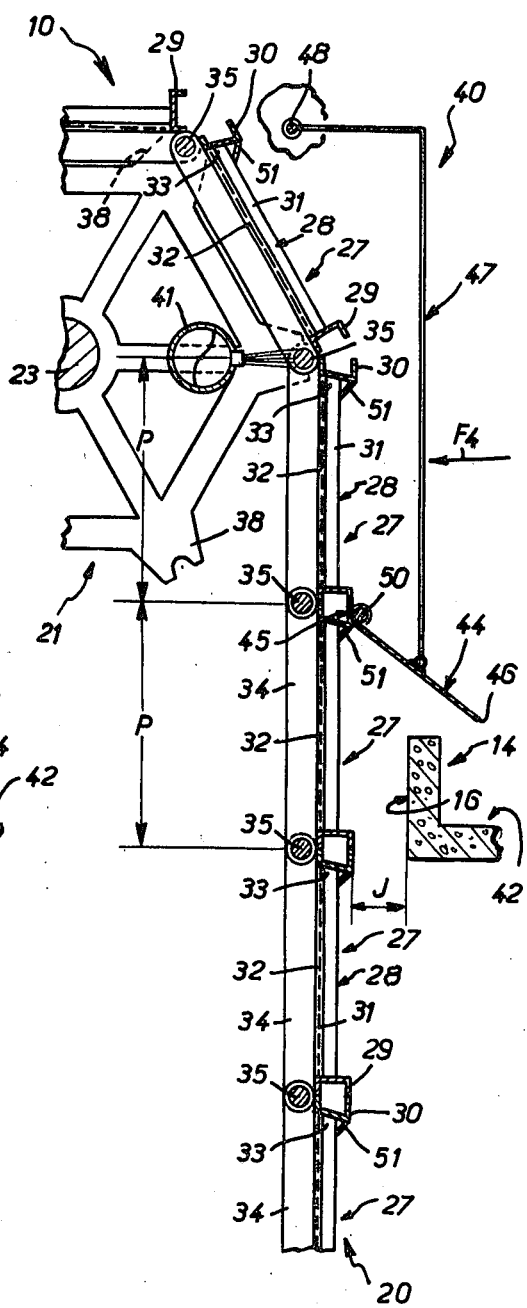

WATER SCREEN WITH REVOLVING SCREEN MEMBER

BACKGROUND OF THE INVENTION

1. Field of the Invention

The present invention relates generally to water screens comprising a revolving screen member, e.g., a band screen or drum screen, commonly used in industrial and agricultural water intakes.

2. Description of the Prior Art

Water intakes are usually situated on the shore of a river, lake or ocean. The water taken in inevitably contains varying quantities of foreign bodies, comprising debris and bodies of natural origin such as leaves, grass, tree branches, fish, algae and seashells, for example, and man-made waste materials, including various containers and other forms of solid industrial waste.

It goes without saying that prior to use the water drawn in through such an intake must have these foreign bodies removed, to eliminate the risk of disrupting the operation of the installations supplied by the intake and shortening the service life thereof.

The removal of foreign bodies is usually carried out in two or more stages.

Initially, a bar screen composed of bars spaced apart a few millimeters or a few centimeters from one another arrests the largest foreign bodies.

In a second stage, on the downstream side of such a bar screen, a screen with a revolving screen member are used. The revolving screen may be a drum screen, for example, in which the screen member comprises cylindrical side wall of a rotating drum.

The present invention is more particularly though not exclusively, concerned, however, with traveling band screens, that is to say with screens comprising an endless screen band passing over a pair of spaced apart direction changing means for changing the direction of the path of movement of the screen band, at least one of the direction changing means being in driving relation with the screen band.

In practice, the screen band of this type of traveling band screen is formed by a succession of screening panels generally supported at respective sides by two chains which pass over a pair of direction changing means, e.g. sprockets, so that the resulting assembly constitutes an endless band passing around these direction changing means. As an alternative, the screening panels may be articulated to one another so as to form of themselves an endless band.

In use, the traveling band screen is disposed in a vertical or inclined position in a sluice forming part of the water intake it equips.

As a general rule, the traveling band screen extends generally transversely relative to the direction of flow of water in the sluice, the generatrices of its screening band being substantially perpendicular to this direction.

In such a case only the upstream run or face of the screening band is in contact with water to be severed, which passes through this upstream run or face and then through its downstream run or face of the screen band.

Such traveling band screens are known as flow-through traveling band screens, and offer the advantage of requiring a minimal installation volume, need only simple and therefore relatively inexpensive masonry structures, and produce no significant turbulence in the installations on the downstream side.

They do have disadvantages, however, of which of present concern is the fact that the outside surface of the screen band is alternately in contact with the water to be filtered, on its upstream side, and water already filtered, on its downstream side.

The foreign bodies to be eliminated accumulate on its upstream run or face and, once deposited on same by the water to be filtered, may be subsequently thrown off into the water already filtered, on the downstream side of the screen band, if the foreign bodies on the screen are not in the meantime removed.

It is thus imperative to provide, in the upper part of the filter, above the water, a washing device.

This normally comprises a sprayer disposed facing one side of one run of the screen band to be washed, to direct a jet of fluid (in practice a flat sheet) towards the screen band, and a recovery device, i.e., a recovery channel, conveyer, endless belt or other type, disposed on the opposite side of one run of the screen band to recover material detached therefrom and the sprayed fluid.

In practice, there is inevitably some gap or clearance between the recovery device and the screen band, to allow for the swinging movement of the latter when in operation. Because of this clearance, the washing device has previously been disposed preferably on the upstream run of the screen band.

If diposed on the downstream run or face of the screen band, in what is normally known as the "carry over" configuration, a significant fraction of the material detached from the screen band can contaminate the water already screened, by falling between the screen band and the recovery device, by virtue of the clearance or gap existing between the screen band and the recovery device.

When the washing device is disposed on the upstream run or face of the screen band material falling off the screen band has as its only consequence the increased cost of recycling this material, without polluting the water already filtered, since the material falls back into the water already filtered, since the material falls back into the water to be filtered.

Thus, for reasons of efficiency, it would be preferable for the washing device to be placed on the downstream run or face screen band.

The material deposited on the screen band builds up a layer of impurities which are detached in a single large piece or smaller parts when subjected to the action of the jet of sprayed-fluid from the sprayer. This detachment is progressive, however, beginning at the generatrix of the screen band where the sprayed fluid impinges the band, relative to the direction of movement of the screen band, this generatrix is a leading edge of the layer of impurities to be detached.

If the washing device is disposed on the upstream run or face of the screen band, so that the fluid spray acts on upward moving screening panels, impurities detached from the screen band as soon as they reach the lower generatrix or limit of the fluid spray, immediately fall under their own weight and thus are not subjected to the full horizontal propulsive force exerted by the fluid spray which is intended to entrain them into the associated recovery device.

On the other hand, if the washing device is disposed on the downstream run or face of the screen band, so that the washing spray acts on downward moving screening panels, the detached impurities fall into the fluid spray and are subjected to the full horizontal propulsive force exerted by the latter, which entrains them into the associated recovery device, although the heaviest particles may escape from the fluid spray and drop into the water already screened.

A general object of the present invention is to provide an arrangement whereby the washing device may be disposed on the downstream face or run of the screen band without any risk of contamination of the already screened water by materials detached from the screen band and escaping from the fluid spray.

SUMMARY OF THE INVENTION

According to the present invention there is provided a water screen comprising a revolving screen member and a washing device disposed adjacent the downstream run or face of said screen member, said washing device comprising a sprayer disposed on one side of said downstream run or face of said screen member to direct a jet of fluid towards said screen member, a recovery device disposed on the opposite side of said downstream run or face of said screen member to recover material detached therefrom, a mobile trough member on said opposite side of said downstream run or face of said screen member between said recovery device and said sprayer, said trough member having a leading edge adjacent said downstream run or face of said screen member and a trailing edge adjacent said recovery device, said trough member extending transversely and obliquely from said leading edge to said trailing edge, and means for maintaining said leading edge of said trough member continuously in contact with said screen member.

A trough member of this kind offers the advantage of overcoming the consequences of the inevitable gap between the screen member and the recovery device, by preventing any material detached from the screen member falling into this gap, instead of being entrained into the recovery device.

Also, the means for maintaining the leading edge of the trough member continuously in contact with the downstream run or face of the screen member enable the trough member to follow the swinging movement of the screen member to adapt itself automatically to the configuration of its surface. Screening efficiency is thereby improved.

Other objects and advantages will appear from the following description of an embodiment of the invention, when considered in connection with the accompanying drawings, and the novel features will be particularly pointed out in the appended claims.

BRIEF DESCRIPTION OF THE DRAWINGS

FIG. 2 is a partially cut-away view, to a larger scale, of part of FIG. 1, included in the chain-dotted box II in FIG. 1.

FIG. 3 is a view similar to that of FIG. 2, illustrating the operation of a washing device.

DESCRIPTION OF THE PREFERRED EMBODIMENT

Figure 1:
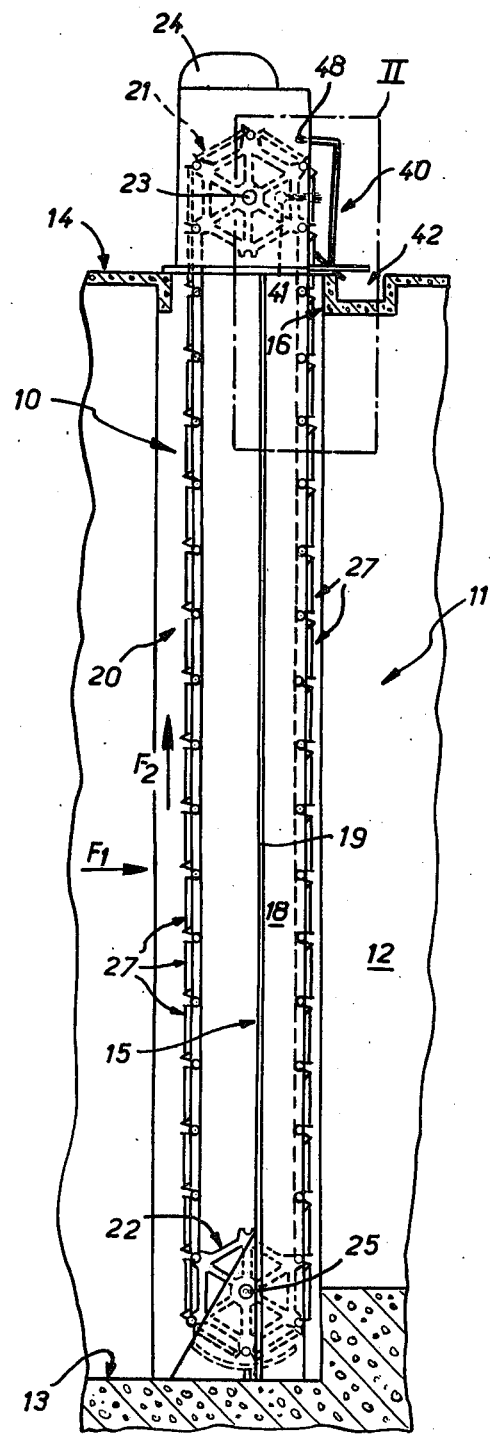
FIG. 1 is a side elevational view of a screen embodying the invention, shown installed in a sluice which is represented in longitudinal vertical section.

The drawings show, by way of example, the invention applied to a through-flow band screen 10 installed in a sluice 11 of a water intake in which the water to be screened flows in the direction shown by arrow F1 in FIG. 1.

In a manner known per se and as disclosed, for example, in U.S. Pat. No. 3,850,804, incorporated herein by reference, sluice 11 comprises two parallel side walls 12, only one of which is visible in FIG. 1, a bottom wall 13 and, parallel to the bottom wall and spaced therefrom, a top wall 14. Band screen 10 extends from one side wall 12 of sluice 11 to the other. It comprises a supporting framework 15 suspended from top wall 14 or placed on bottom wall 13, passing through an opening 16 in top wall 14.

As supporting framework 15 does not constitute part of the present invention, it will not be described in detail here. Suffice is to say that, in a manner known per se and as described, for example, in the aforementioned U.S. Patent, it comprises two side flanges 18 slidably engaged by means of a lip 19 in vertical guides provided for this purpose in side walls 12 of sluice 11.

Traveling band screen 10 comprises an endless screen band 20 moving over top and bottom direction changing means for changing the direction of the path of movement of the screen band, respectively, at least one of which is in driving relation with the screen band.

In practice, the driving direction changing means comprise a top sprocket, above the top wall 14 of sluice 11. The shaft 23 of top sprocket 21 is mounted to rotate on supporting framework 15 and is driven by drive means such as the output shaft of a motor 24, for example. In the embodiment shown the bottom direction changing means comprise an idler sprocket 22 which is mounted to rotate freely on a shaft 25 supported by supporting framework 15.

As an alternative, the bottom direction changing means may be replaced by appropriately shaped guides or tracks.

The generatrices of screen band 20 and shafts 23, 25 of sprockets 21, 22 extend substantially perpendicular to the direction F1 in which the water to be screened flows in sluice 11. The direction in which screen band 20 moves over said sprockets 21, 22 is such that its upstream side on which water to be treated impinges, moves upwards in the sluice 11, in the direction of the arrow F2 in FIG. 1.

In practice, screen band 20 comprises a succession of articulated band panels 27.

Screening panels 27, each of which is generally rectangular in configuration, are rigid and may, for example, be of similar construction to the screen panels disclosed in above-mentioned U.S. Pat. No. 3,850,804.

Alternatively, and as shown, each comprises a rigid frame 28 projecting forwardly relative to a screening cloth 32 and against which screening cloth 32 is held by front and rear cross members 29, 30 and two longitudinal members 31 joining same together.

In practice, rigid frame 28 applies screening cloth 32 against another frame 34 and stiffens the assembly.

In the embodiment shown, longitudinal members 31 are set back relative to cross members 29, 30, with the result that cross members 29, 30 project beyond corresponding longitudinal members 31.

Also in the embodiment shown, cross member 30, which is the rear cross member relative to the direction of movement of screen member 20, is shaped so as to form, in conjunction with screening cloth 32, a bucket 33.

These constructional details do not form part of the present invention and are well known per se. They are described for purposes of illustration only. They do not in any way constitute a limitation on the scope of the present invention.

The same applies to the connections between screening panels 27.

For example, and as shown, this connection may be provided by pins 35 which pivot together adjacent pairs of screening panels 27 and which at their ends, beyond screening panels 27, are designed to mesh directly with sprocket 21, 22 having teeth 38. Thus screening panels 27 together define an endless loop running over sprockets 21, 22.

Alternatively, and as disclosed in U.S. Pat. No. 3,850,804 mentioned hereinabove, for example, the screening panels may be supported at their ends by two parallel endless chains passing over sprockets 21, 22.

Once again, these arrangements do not form in themselves part of the present invention and are well known per se. Thus they will not be described in detail here.

In the usual manner known per se band screen 10 further comprises, at the top and above top wall 14, a washing device 40 for cleaning the outside surface of screen band 20.

As shown, this washing device 40 is disposed on the downstream run or face of screen band 20.

The washing device 40 comprises a sprayer 41 disposed facing one side of the downstream run or face of the screen band to be cleaned, inside the confines of the screening band, between its upstream and downstream runs or faces, extending transversely of screen band 20 and designed to spray a jet of fluid in the direction of the letter, along a generatrix of the screen band. The washing device 40 further comprises a recovery device disposed on the opposite side of the downstream face or run of the screen band 20 to recover material detached therefrom by sprayer 41.

In the embodiment shown, recovery device comprises a recovery channel 42 formed in top wall 14 adjacent opening 16 therein.

As is more clearly visible in FIGS. 2 and 3, this design is such that inevitably a gap or clearance J between recovery channel 42 and screen band 20 is formed.

In accordance with the invention, band screen 10 further comprises, on the same side as recovery channel 42 and between same and sprayer 41 a trough member 44 extending transversely and obliquely from its leading edge 45 adjacent screening band 20 to its trailing edge 46 adjacent recovery channel 42. Trough member 44 is mobile and maintains its leading edge 45 continuously in contact with screen band 20, and its trailing edge 46 is thus maintained continuously above recovery channel 42.

In the embodiment shown, trough member 44 is constituted by a simple flat panel and is supported by an arm 47 (in practice by a pair of arms) pivoting about an axis 48 offset from its leading edge 45 vertically and in the direction towards screening band 20, so that the leading edge of the trough member 44 is maintained continuously in contact with the screen band by the action of gravity; the center of gravity of the assembly of the panel constituting trough member 44 and arm 47 supporting same are offset relative to the vertical plane passing through pivot axis 48 of arm 47. In the embodiment shown arm 47 is bent.

Irrespective of its shape, it is rigidly attached to trough member 44 which it supports, at a predetermined angle.

Since in practice there are two arms, these are attached to trough member 44 at its opposite lateral ends.

Leading edge 45 of trough member 44 is preferably equipped with roller means for contact with the screen band.

For example, and as shown, these means comprise two rollers 50 disposed one at each end of trough member 44 and mounted so as to be rotatable thereon.

Each screening panel 27 preferably incorporates an inclined ramp surface 51 where each of its longitudinal members 31 joins its rearward cross member 30, (relative to the direction of displacement of the screen band) cooperating with the aforementioned roller means.

Thus it will be readily appreciated that by virtue of gravity alone trough member 44 in accordance with the invention is maintained continuously with rollers 50 on its leading edge 45 against screen band 20.

In practice, as screening panels 27 of screen band 20 advance, rollers 50 of trough member 44 roll on longitudinal members 31 of screening panels 27, which act as guides for these rollers 50.

In other words, by virtue of rollers 50 on its leading edge 55 and the force maintaining this leading edge continuously in contact with the screen band, trough member 44 is able to follow movements of longitudinal members 31 of each screening panel 27.

Thus, and as is more clearly visible in FIG. 2, on each screening panel 27, between its cross members 29, 30, leading edge 45 of trough member 44 is closer to the corresponding screening cloth 32 than the outer surfaces of cross members 29, 30.

Consequently, any material previously detached from screen band 20 by the jet of fluid sprayed onto the latter by sprayer 41 and falling under the effect of gravity towards the clearance or gap J between the screen band 20 and recovery channel 42 is necessarily recovered by trough member 44 in accordance with the invention, which is maintained at all times in the path of movement of such material, which is thereby entrained towards recovery channel 42 without risk of it contaminating the water already filtered.

As they move along, screening panels 27 push back trough member 44, by virtue of their inclined ramp surfaces 51 and as shown by arrow F3 in FIG. 2. This enables the trough member 44 first to move over the rear cross member 30 of one screening panel 27 and then the front cross member 29 of the next screening panel, before being returned by gravity and as shown by arrow F4 in FIG. 3 so that rollers 50 on leading edge 45 bear against longitudinal members 31 of the next screening panel, so that the process as described above is repeated from one screening panel 27 to the next.

Means are preferably provided for interrupting washing of the screening cloth 32 of a screening panel 27 when leading edge 45 of trough member 44 is in line with cross members 29, 30 of two consecutive screening panels 27, to prevent material detached from the downstream run of screen band 20 slipping between trough member 44 and the cross members 29, 30 of the two consecutive screening panels.

It may suffice, for example, to operate the sprayer 41 intermittently.

Preferably, however, and to this same end, trough member 44 may, as shown, be simply disposed so that its leading edge 45 is at a distance from sprayer 41 which is an integer multiple of length P of two consecutive screening panels 27. In practice, in the embodiment shown, the distance from the leading edge 45 of the trough member 44 to the sprayer is P.

Thus when leading edge 45 of trough member 44 reaches cross members 29, 30 of two consecutive screening panels 27, the jet of fluid sprayed by sprayer 41 is also in line with cross member 29, 30 of the upstream screening panel 27 and the following screening panel 27, as shown in FIG. 3. Thus at this time no material can be detached from either associated screening cloth 32 by this jet of fluid.

It will be understood that various changes in the details, materials, and arrangements of parts, which have been herein described and illustrated in order to explain the nature of the invention, will be apparent to those skilled in the art which may be incorporated without depending from the scope of the invention.

For example, trough member 44 may be of a configuration other than a simple flat panel, having a more or less complex profile, for example.

Furthermore, the means for maintaining its leading edge continuously in contact with the screen band may not be dependent on gravity alone. These means could comprise resilient means or pneumatic actuators, for example.

Also, the recovery channel may be replaced with another type of recovery device, such as a conveyer, endless belt, dumping member or the like.

Finally, the invention is not limited to flow-through traveling band screens. On the contrary, the invention is equally applicable to dual-flow traveling band screen and drum screens having a drum screen rotating about its axis.

What I claim is:

1. A water screen comprising a revolving screen member and a washing device disposed adjacent the downstream run or face of said screen member, said washing device comprising a spray means disposed on one side of said downstream run or face of said screen member to direct a jet of fluid towards said screen member to detach material deposited thereon, a recovery device disposed on the opposite side of said downstream run or face of said screen member to recover the material detached therefrom, a mobile trough member on said opposite side of said downstream run or face of said screen member between said recovery device and said sprayer, said trough member having a leading edge adjacent said downstream run or face of said screen member and a trailing edge adjacent said recovery device, said trough member extending transversely and obliquely from said leading edge to said trailing edge, and pivot means for maintaining said leading edge of said trough member continuously in contact with said screen member, for preventing the material from falling between said screen member and said recovery device.

2. A water screen according to claim 1, wherein said trough member is supported by an arm pivoted about an axis offset vertically from said leading edge and in a direction towards said screen member, whereby said leading edge of said trough member is maintained continuously in contact with said screen band by the effect of gravitational force thereon.

3. A water screen according to claim 1, wherein said screen member comprises a screen band having a succession of screening panels, each of said screening panels incorporating a screening cloth and, projecting outwardly relative to said screening cloth, a frame made up of two cross members and two longitudinal members set back from said cross members, said leading edge of said trough member being adapted to follow said longitudinal members of said screening panels, under the effect of said means for maintaining said leading edge of said trough continuously in contact with said screen band, in such a way that said leading edge is closer to said screening cloth of each said screening panel than the external surfaces of its corresponding cross members.

4. A water screen according to claim 1, wherein said screen member comprises a succession of screening panels, each of said screening panels incorporates a screening cloth and a frame made up of two cross members and two longitudinal members, and wherein said trough member is disposed so that its leading edge is at a distance from said sprayer which is an integer multiple of the length of one said screening panel, whereby spraying is interrupted when said leading edge of said trough is aligned with said cross members between two consecutive screening panels.

5. A water screen according to claim 4, wherein the distance of said leading edge of said trough member from said sprayer is equal to the length of one said screening panel.

6. A water screen according to claim 1, wherein said leading edge of said trough member is equipped with roller means for contact said screen member.

7. A water screen according to claim 3, wherein said leading edge of said trough member is equipped with roller means for contact said screen member, and each of said screening panels incorporates an inclined ramp surface where each of said longitudinal members thereof joins the rearward of said cross members relative to the direction of movement of said screening panel, said ramp surface cooperating with said roller means.

* * * * *